Aug. 30, 1932.  J. G. SHODRON  1,874,644
TILE FLOORING
Filed Aug. 22, 1928

INVENTOR.
John G. Shodron
BY
Erwin, Wheeler & Woolard
ATTORNEYS.

Patented Aug. 30, 1932

1,874,644

UNITED STATES PATENT OFFICE

JOHN G. SHODRON, OF FORT ATKINSON, WISCONSIN, ASSIGNOR TO JAMES MANUFACTURING COMPANY, OF FORT ATKINSON, WISCONSIN, A CORPORATION OF WISCONSIN

TILE FLOORING

Application filed August 22, 1928. Serial No. 301,206.

This invention relates to improvements in tile flooring.

The tile of this invention is intended and adapted for use for a wide variety of purposes, including flooring for buildings of all sorts and floor bases upon which other flooring such as any composition floor or rubber or cork, tile or linoleum may be laid. The particular and specific purpose from the standpoint of which the invention will be described and discussed herein is the application of this tile to the flooring of stalls and the like, in which service this tile has a number of advantages over anything previously used for the purpose.

It has been difficult to find a material suitable for paving high quality animal stalls in a suitable manner. Sanitary conditions preclude the use of wood or other fibrous materials unless such materials are rendered substantially water proof through impregnation or surface covering. The hoofs of the animals will destroy any ordinary surface covering and the materials used for impregnation are either offensive from the standpoint of odor or become adhesive when warm, as is the case with substances of a pitchy or tar-like nature, and adhere to an animal lying thereon. Concrete has been widely used because of the fact that it may be washed easily, and is substantially impervious to moisture and will endure under the heavy wear occasioned by the impact of animals' hoofs thereon. Much disease and illness, however, has been traceable to the coldness of concrete floors due to direct contact with the ground and relatively high conductivity of the concrete. Tile of rubber and the like is cut by the hoofs of the animals and other soft tile which have been tested have become abraded away leaving projecting ribs of cement which are uncomfortable to the stock.

It is the purpose of the present invention to provide a flooring tile having low heat conductivity, relatively low moisture absorption characteristics, and a relatively hard and easily washable face which is not only scored to protect the stock against slipping thereon but is substantially square in plan so that in laying the tile the score lines may be laid to run in different directions. It is preferred that this tile should be made of inherently non-fibrous material so as to require no treatment with water-proofing agents. It is my purpose to overcome all of the objections above noted which have been found in previous stall flooring material and it will be obvious from the following disclosure that the tile forming the subject matter of this application successfully avoids all objections heretofore experienced.

In the drawing—

Like parts are identified by similar reference characters throughout the several views.

For purposes of economy, a tile embodying this invention is preferably made relatively thin so that a comparatively large area of surface can be covered with a given weight of material.

Figure 1:
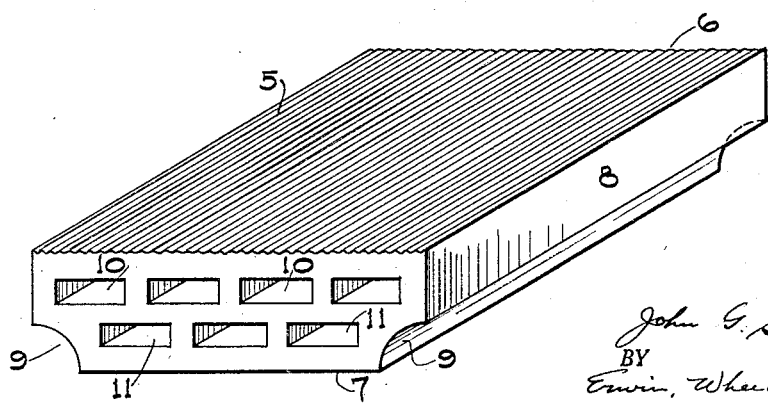
Figure 1 is a perspective view of a single tile embodying this invention.

It will be observed from an inspection of Figure 1 that the tile of my invention comprises a block of generally rectangular outline, the upper face 5 thereof being substantially square and ribbed or grooved, as shown at 6, by combing to produce a non-skid surface. The under face 7 of the tile, however, is not square but oblong due to the fact that the sides 8 of the tile are cut away at their lower corners, as shown at 9, in order that mortar joints between the tile need not extend completely through to the base therebeneath.

Between the top surface 6 of the tile and the bottom surface 7 thereof, the tile is provided with longitudinally extending channels 10 and 11. The channels 11 in the lower row are staggered with reference to the channels 10 of the upper row and are fewer in number than channels 10 because of the fact that less space is available between recesses 9 and the ends near the top of the tile.

The channels or recessed corners 9 are of such dimensions as to effectively take the place of the half passages 11 which might otherwise have been placed to open at the sides of the tile. At the same time, the beveled and especially the rounded contour of the recesses or channels 9 is less liable to breakage than would be the case if a half passage 11 of rectangular contour were substituted. It will be observed that the rectangular channels 10 and 11 and the recessed corner channels 9 cooperate to elongate all paths of heat conduction through the tile and thus tend to insulate thermally the body of an animal reposing on this tile from the cold ground therebeneath.

Tile embodying this invention will preferably be laid upon a base 15 of concrete or like material. It is preferred to bond the tile to the base and for this purpose a thin bed of mortar or cement is provided at 16. In laying the tile upon this base, the tile are preferably laid in a recular pattern in which the ribs or grooves 6 in the face of adjacent tile are alternately varied in direction, one tile having its grooves longitudinal of the stall and the next tile having its grooves transversely thereof, as shown in Figure 2.

There are two reasons why it is desirable to vary alternately the positions of consecutive tile. In the first place, the grooved face thereof is obviously effective to prevent slipping when the slip occurs transversely of the ribs. If the grooves were all aligned in one direction, slipping might easily occur in such direction although the grooves would be effective to prevent slipping in a transverse direction. By alternating the direction of the grooves, the surface of the floor is made an effective bar to skidding in any direction. It will be observed that each of the channels opening through the upper part of the tile is completely cut off from communication with all other channels in the assembled floor by an imperforate opposing side face 8 of an adjacent tile. This is a desirable arrangement for effective heat insulation since it prevents the existence of convection currents in the floor.

Figure 3:
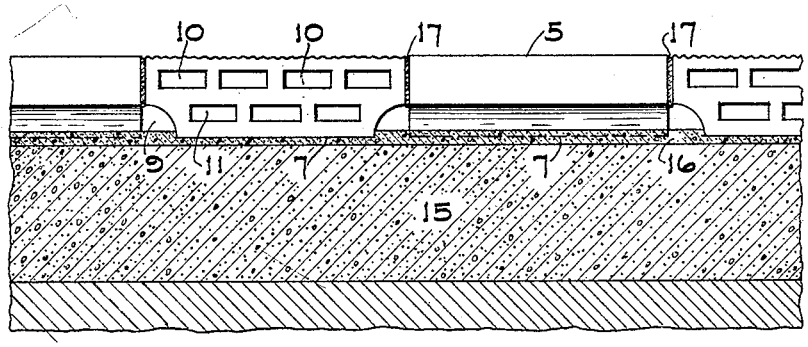
Figure 3 is a section through the floor shown in Figure 2 taken on the line 3—3 of Figure 2.

As for channels 11 and 9, however, it will be observed that these channels are in complete, although necessarily indirect, communication throughout the completed floor since, as shown in Figure 3, the ends of channels 11 will adjoin one of the recesses or channels 9 which in turn will communicate with other channels 9 of the blocks or tile adjacent thereto. This establishes a complete network of communicating passages at the base of the tile which may, if desired, be connected with a drain where the tile used is semi-porous. Although the connection thus established will conduct water from beneath the completed floor, it will be obvious that at the same time it offers an effective obstruction to convection currents since the passages provided at the base of the tile are not direct but are extremely devious.

Figure 2:
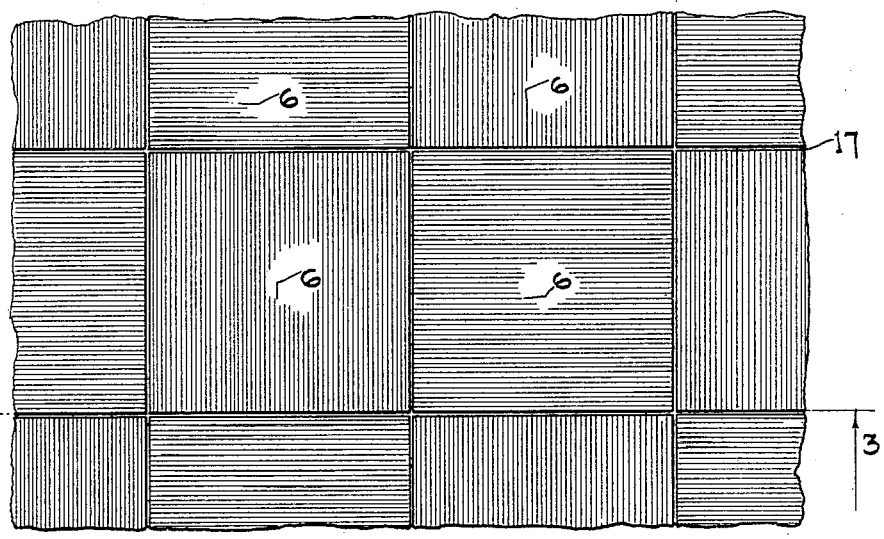
Figure 2 is a view on a smaller scale showing in plan a fragment of a floor laid with such tile.

Since mortar is more or less conductive both of heat and moisture, the mortar joints between adjacent tile are made very thin as suggested at 17 in Figures 2 and 3. As already pointed out, these joints do not extend from top to base of the tile but are coextensive with the overhanging side surfaces 8 thereof and terminate above the channels 9 of one tile and the terminal portions of channels 11 of the adjacent tile.

While a variety of materials may be used to construct tile flooring embodying this invention, it is preferred to use a relatively non-porous material having relatively low heat conductivity. A hard burned clay serves the purpose well and it is even possible for special purposes to glaze a clay tile. A high grade of concrete may also be used. Stone would be serviceable but for the expense of manufacture. Clay, however, is preferred.

By providing upwardly opening grooves or corrugations in the upper surface of the tile, even a tile from which litter is absent will absorb heat from the body of an animal much less rapidly than would be the case if the surface were flat. These grooves, therefore, co-operate with the channels in providing a floor which will not readily absorb heat from the animal and conduct it to damp earth underneath.

I claim:

1. A tile floor comprising consecutive square tiles laid at right angles to each other, each tile being provided with interior drain channels and undercut margins substantially parallel to the drain channels, said channels and margins co-acting with the corresponding portions on opposite sides of adjacent tiles to produce continuous drain channels extending in two directions.

2. A tile having a square top portion and an oblong bottom portion, the width of said bottom portion being less than a side of the square top and said bottom portion having undercut margins at opposite sides, whereby when two of said tiles are assembled in right angle relation to each other, drain channels will be provided by said undercut margins.

3. As a new article of manufacture, a floor tile substantially square in outline and provided with a grooved upper surface and beveled margins at two of its sides in the lower half portions of said side margins, and channels extending through said tile substantially parallel to said sides, said tile being adapted to co-operate with like tile disposed with its grooves at right angles thereto and providing downwardly opening channels along the side margins.

4. As a new article of manufacture, a floor tile substantially square in outline and having opposite sides substantially perpendicular to the upper surface of the tile adjacent thereto and beveled away at their lower margins to form with adjacent tile downwardly opening channels, said tile having a series of channels opening at its unbeveled ends at substantially the level of the beveled portions of its sides and adapted for communication with the marginal channels of similar tile disposed at right angles thereto.

5. As a new article of manufacture, a tile of rectangular outline provided immediately beneath its face with a series of channels opening at its ends and having beneath said first series of channels a second series of channels of less number staggered in relation to the channels of the first series, the sides of said tile being beveled to the bottom thereof at and below the level of said second series of channels.

6. As a new article of manufacture, a hollow floor tile of substantially square outline in plan, said tile having an upper series of channels immediately beneath its face and a lower series of channels staggered with reference to said upper series and reduced in number, and laterally opening concave recesses along the sides of said tile paralleling said channels and substantially at the level of the lower series of channels.

7. Tile flooring comprising substantially square floor tiles, each provided with upper and lower series of channels opening to its ends, and having its sides recessed at the level of the lower series of channels, certain of said tiles being arranged alternately whereby to seal the channels of the upper series while affording communication through said recesses between channels of the lower series.

8. A stable floor, comprising consecutive rows of square tiles having exposed grooves in their upper surfaces said tiles each having internal channels at different levels staggered in upper and lower series and extending entirely through the tile, the margins of each tile parallel to said corrugations being substantially abutting to other tile along their upper portions and having their lower portions recessed concavely to form with adjacent tile, downwardly opening channels, the consecutive tile in each row being disposed with their respective corrugations, channels and recesses at right angles to each other, whereby said recesses form half channels along all abutting side margins of the tiles.

9. A stable floor comprising consecutive rows extending in two directions of substantially square tile having upper surfaces grooved and provided with internal cavities, each tile being supported by the others and cooperating with adjacent tile to form drainage channels extending in both of said directions along the bottoms of the tiles and with which said cavities communicate.

10. A floor comprising a series of identical tile alternately laid in opposite directions, each such tile having a substantially square exposed surface and a lower portion undercut on two sides and co-operating with the adjacent tiles to form concealed channels, said tiles being substantially perpendicular on the other two sides, whereby the undercut sides of tiles in the floor are supported by perpendicular sides of adjacent tiles.

JOHN G. SHODRON.